May 14, 1946. J. P. BURKE 2,400,072
LOCK NUT
Filed Sept. 26, 1944
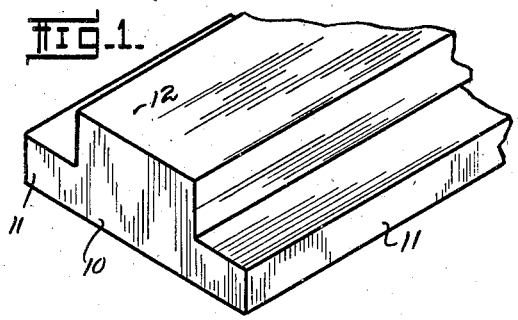
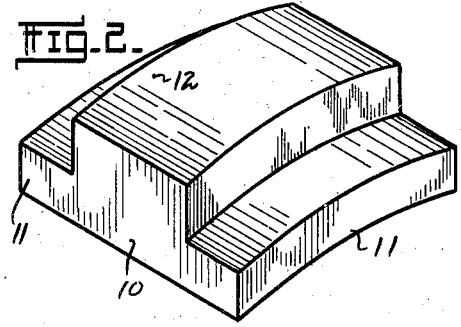
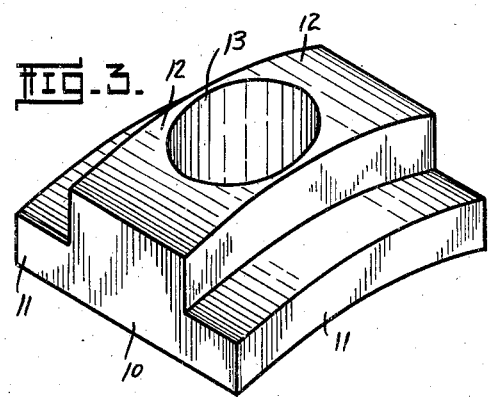
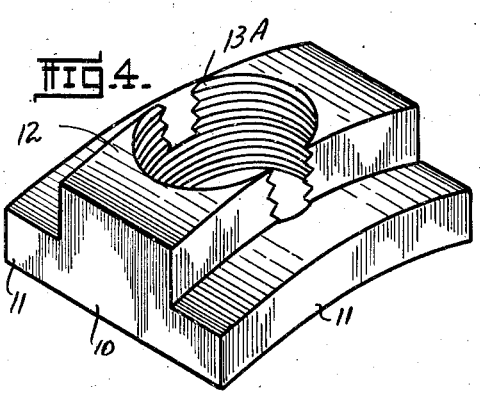
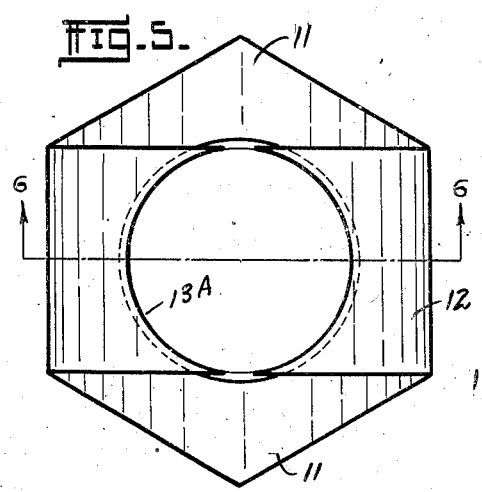
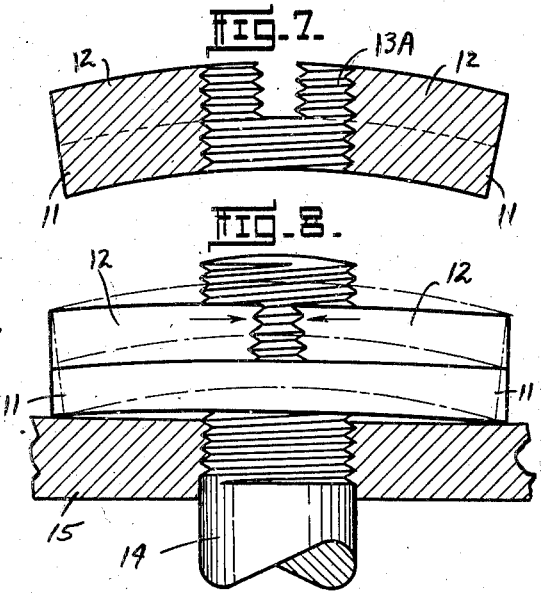
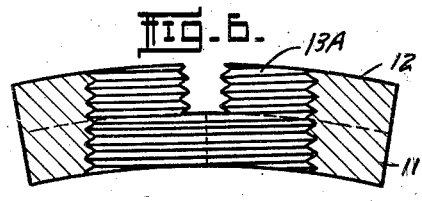
Inventor
James P. Burke.
W. B. Harpsman
Attorney Patented May 14, 1946

2,400,072

UNITED STATES PATENT OFFICE 2,400,072

LOCK NUT

James P. Burke, Poland, Ohio, assignor to Frank L. McLaughlin, Detroit, Mich.

Application September 26, 1944, Serial No. 555,851

2 Claims. (Cl. 151—21)

This invention relates to lock nuts and more particularly to a lock nut incorporating the desirable characteristics of a quick threading nut.

The principal object of the invention is the provision of a quick threading lock nut which may be inexpensively formed from rolled or extruded bar stock or which may be made by the cold heading process where a special perimeter contour other than square may be designed for special wrenches.

A further object of the invention is the provision of a lock nut that will not damage or break the tap during the tapping operation especially when tapped automatically by the so-called bent tap method.

It is well known that several attempts have been made to provide a nut that will pinch or clamp a screw or bolt when it is drawn down tightly into fastened position. Such nuts usually incorporate an arched face on the underside of the nut and a slot or kerf cut across the top of the nut. This method is more or less satisfactory but objectionable from a cost standpoint as the necessity of cutting the kerf or slot after the nut is threaded or so forming the kerf before it is tapped seriously interferes with a successful tapping operation particularly where an automatic tapper is employed. This is due to the tap having a tendency to kick off-center when it tries to cut the threads through the slotted portion which usually results in breaking the tap. When the slotting is done after the tapping operation it is necessary to clean the burrs out of the threads. It is, therefore, one of the objects of this invention to provide for the elimination of these difficulties in the formation of a lock nut.

A still further object of the invention is the provision of a lock nut that will clamp the bolt with an ever increasing pressure as the nut is drawn down against the member to be held.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a perspective view of a section of ribbed stock.

Figure 2 is a perspective view of a sheared section of ribbed stock showing the same arched or bent on a transverse axis.

Figure 3 is a perspective view of the lock nut section showing the punched centrally located opening.

Figure 4 is a perspective view of the lock nut showing the cap central opening thereof.

Figure 5 is a top plan view of the lock nut showing the edges thereof in finished form.

Figure 6 is a cross sectional elevation taken on lines 6—6 of Figure 5.

Figure 7 is a cross sectional elevation similar to that illustrated in Figure 6 and illustrates a lock nut having a modified base shape.

Figure 8 is a side elevation of the lock nut in locked position on a bolt showing the same in position against a member to be held thereby.

By referring to the drawing and Figure 1 in particular it will be seen that the primary form of the lock nut of this invention comprises a section of rolled or extruded bar stock 10 having a pair of oppositely disposed base flanges 11 and an elevated central rib section 12 therein positioned longitudinally of the said ribbed stock. Nut-like sections of the ribbed stock 10 are cut therefrom so as to form approximately square sections. By referring to Figure 2 one of these nut-like sections may be seen, the same having been transversely curved either at the time of cutting or thereafter. In Figure 2 the transverse curve may be seen as being formed on the original longitudinal axis of the bar stock.

In Figure 3 the section of curved bar stock is shown punched to form a central opening 13.

In Figure 4 the following step in the formation of the lock nut is illustrated, the central opening 13 being tapped as indicated at 13A. It will be observed that in the tapping operation forming the threaded or tapped area 13A the side sections of the rib 12 are cut away.

By referring now to Figure 5 of the drawing a top plan view of the finished lock nut may be seen wherein the corners of the oppositely disposed base flanges 11 are cut away to form a desirable hexagonal shape. It is understood that this is an optional shaping operation and that if desired the base section 11 may be allowed to remain square as illustrated in Figure 4.

In Figure 6 a cross sectional illustration of the finished lock nut shown in Figure 5 is shown, it being observed that the tapped area 13A is on a vertical plane whereas the rib 12 and base 11 portions of the nut are curved.

In Figure 7 a similar cross sectional illustration is illustrated showing a smaller tapped area 13A and a square base 11. It will be observed that at such time as the lock nut is positioned on a threaded bolt or screw and turned downwardly against a member to be held thereby, the engagement of the flanges 11 of the base of the nut against the member to be held will cause the sections of the rib 12 to move toward each other.

In Figure 8 of the drawing this action is illustrated the lock nut being shown in position on a threaded bolt 14 against a member 15 thereon and arrows indicate the movement of the portions of the rib 12 toward the center so as to firmly clamp the threaded portion of the bolt 14 and thereby lock the nut in place thereon. It will be seen that in so doing the normally curved form of the lock nut is practically eliminated and it is returned to an approximately flat section.

It will thus be seen that the lock nut shown and described herein is simply formed from a T shape cross section of rolled or extruded stock so as to form a base and rib portion, that the stock is then cut into appropriately sized sections and these sections arched on the longitudinal axis of the rib. That these sections are then punched and tapped so that the rib forms in effect two rib sections and the base forms in effect a hinge holding the same together. The curve having been formed on the longitudinal axis of the rib sections provides for the central travel of the two rib sections at such time as the lock nut is flattened as by its threadable positioning on a bolt or screw and its being drawn into tight engagement against the head of the bolt or screw or against the member thereon to be held. In assuming its flat form the two rib sections must of necessity travel toward the center hinge on the base flanges and to be clamped against the bolt or screw and thus locking the said lock nut thereon.

Having thus described my invention, what I claim is:

1. A lock nut comprising an integrally formed base portion and a rib portion, a threaded aperture extending through both portions, the said threaded aperture being of such diameter as to form openings in the parallel sides of the rib portion, the said lock nut being arched on the longitudinal axis of the said rib portion so as to form an unsupported center area in the said base portion.

2. A lock nut comprising an integrally formed base portion and a square shouldered rib portion, a threaded aperture extending through both portions, the said threaded aperture being of such diameter as to form openings in the parallel sides of the rib portion, the said lock nut being arched on the longitudinal axis of the said rib portion so as to form an unsupported center area in the said base portion, the ends of the said base portion underlying the said rib portion being bent downwardly thereby elevating the unsupported area thereof.

JAMES P. BURKE.